(12) United States Patent
Foit et al.

(10) Patent No.: US 12,281,397 B2
(45) Date of Patent: Apr. 22, 2025

(54) PRODUCING CARBON MONOXIDE

(71) Applicant: Forschungszentrum Jülich GmbH, Jülich (DE)

(72) Inventors: Severin Foit, Linnich (DE); Lucy Dittrich, Aachen (DE); Rüdiger-A Eichel, Jülich (DE); L. G. J. De Haart, EA Vaals (NL)

(73) Assignee: Forschungszentrum Jülich GmbH, Jülich (DE)

( * ) Notice: Subject to any disclaimer, the term of this patent is extended or adjusted under 35 U.S.C. 154(b) by 440 days.

(21) Appl. No.: 17/764,380

(22) PCT Filed: Oct. 7, 2020

(86) PCT No.: PCT/EP2020/078128
§ 371 (c)(1),
(2) Date: Mar. 28, 2022

(87) PCT Pub. No.: WO2021/069498
PCT Pub. Date: Apr. 15, 2021

(65) Prior Publication Data
US 2022/0290312 A1    Sep. 15, 2022

(30) Foreign Application Priority Data
Oct. 8, 2019 (DE) .................. 10 2019 127 037.5

(51) Int. Cl.
*C25B 1/23* (2021.01)
*C25B 1/042* (2021.01)
(Continued)

(52) U.S. Cl.
CPC .................. *C25B 1/23* (2021.01); *C25B 9/23* (2021.01); *C25B 9/67* (2021.01); *C25B 15/08* (2013.01); *C25B 1/042* (2021.01)

(58) Field of Classification Search
CPC .... C25B 1/23; C25B 9/23; C25B 9/67; C25B 15/08; C25B 1/042; C25B 1/02; C25B 1/00; C25B 1/50; Y02E 60/36; Y02P 20/141
See application file for complete search history.

(56) References Cited

U.S. PATENT DOCUMENTS 3,053,748 A * 9/1962 Yelnik .................... C25C 3/125
204/243.1
6,155,212 A * 12/2000 McAlister .............. F02M 27/02
123/3

(Continued)

FOREIGN PATENT DOCUMENTS

| CN | 104919023 A | 9/2015 |
| CN | 107180985 A | 9/2017 |

(Continued)

*Primary Examiner* — Jacob M Amick
*Assistant Examiner* — Charles J Brauch
(74) *Attorney, Agent, or Firm* — Occhiuti & Rohlicek LLP

(57) ABSTRACT

The invention relates to a method for producing carbon monoxide, comprising the following steps:
a) humidifying an educt gas containing carbon dioxide with water,
b) supplying the humidified educt gas from step a) into an electrolytic cell (1), and
c) electrolyzing the humidified educt gas supplied according to step b) in the electrolytic cell (1) such that the carbon monoxide is obtained.

Figure 1:
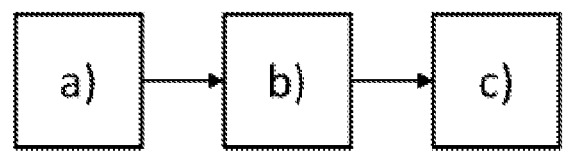

With the described method and with the described device (12), carbon monoxide can be produced via $CO_2$ electrolysis with particularly high efficiency. This is achieved with the educt gas containing carbon dioxide being humidified before the electrolysis.

16 Claims, 2 Drawing Sheets

(51) Int. Cl.
  *C25B 9/23*   (2021.01)
  *C25B 9/67*   (2021.01)
  *C25B 15/08*  (2006.01)

(56)  References Cited

U.S. PATENT DOCUMENTS

2015/0299871 A1   10/2015   Chen et al.
2019/0127865 A1*  5/2019   Li ............................ C25B 3/26

FOREIGN PATENT DOCUMENTS

| DE | 102015226111 A1 | 6/2017 |
| DE | 102017213473 A1 | 2/2019 |
| DE | 102017214456 A1 | 2/2019 |
| DE | 102018210303 A1 | 1/2020 |
| WO | 2012118065 A1 | 9/2012 |
| WO | 2018044720 A1 | 3/2018 |
| WO | 2019206450 A1 | 10/2019 |

* cited by examiner

PRODUCING CARBON MONOXIDE

CROSS REFERENCE TO RELATED APPLICATIONS

This application is a U.S. national stage application of International Application no. PCT/EP2020/078128, filed Oct. 7, 2020, which claims the benefit of the filing date of German Application No. 10 2019 127 037.5, filed Oct. 8, 2019, the contents of which are hereby incorporated by reference in their entirety.

Many energy production processes release carbon dioxide. In order to reduce the climate-damaging effects of carbon dioxide in the atmosphere, the carbon dioxide can be converted into other substances. However, this is made more difficult by the fact that carbon dioxide is stable and not very reactive. In addition, the carbon in the carbon dioxide molecule is in its highest oxidation state. Carbon dioxide can therefore no longer be used to generate energy by means of incineration.

However, carbon dioxide can be reduced to carbon monoxide by supplying energy. The carbon in carbon monoxide is in a lower oxidation state than in carbon dioxide. Accordingly, carbon monoxide can be used for more applications than carbon dioxide.

Converting carbon dioxide into carbon monoxide not only reduces the amount of climate-damaging carbon dioxide. A valuable chemical raw material is also obtained with carbon monoxide.

For example, carbon monoxide combines with hydrogen to form a synthesis gas containing the elements carbon, oxygen and hydrogen, which are necessary for the production of important organic chemicals. This synthesis gas is therefore suitable for many petrochemical processes, for example for the production of synthetic fuel, natural gas, methanol or formaldehyde. Hydrogen can be obtained comparatively easily using various methods. Therefore, the production of carbon monoxide is of particular importance.

Producing a chemical using energy is also known as "Power-to-X" because energy ("Power") can be used to obtain a chemical ("X"). By using climate-damaging carbon dioxide as a starting material, this concept can contribute to reducing global warming. In addition, fossil fuels can be saved by generating synthetic fuels from the carbon monoxide obtained. Synthetic fuel can be used to drive motor vehicles in an environmentally friendly manner without extensive changes to the design of the motor vehicles being required. For these reasons, the conversion of carbon dioxide to carbon monoxide can contribute to the energy transition, in particular if renewable energy is used to convert the carbon dioxide into carbon monoxide.

Electrolysis processes are known from the prior art, with which carbon dioxide can be converted into carbon monoxide by supplying energy. However, these processes have low efficiency.

Proceeding from this, the present invention is based on the object of at least partly overcoming the problems known from the prior art and in particular to present a method and a device for production of carbon monoxide, with which method and device improved efficiency can be achieved.

These objects are achieved with the features of the independent claims. Further advantageous embodiments of the invention are specified in the dependently formulated claims. The features listed individually in the dependently formulated claims can be combined with one another in a technologically meaningful manner and can define further embodiments of the invention. In addition, the features specified in the claims are described and explained in more detail in the description, further preferred embodiments of the invention being thereby shown.

According to the invention, a method for producing carbon monoxide is presented. The method comprises:
 a) humidifying an educt gas containing carbon dioxide with water,
 b) supplying the humidified educt gas from step a) into an electrolytic cell, and
 c) electrolyzing the humidified educt gas supplied according to step b) in the electrolytic cell such that the carbon monoxide is obtained.

Carbon monoxide can be produced using the method described. Together with hydrogen, carbon monoxide forms the synthesis gas described in the prior art. The described method is part of the "Power-to-X" concept. In contrast to co-electrolysis, however, the described method does not aim at the direct production of synthesis gas from carbon monoxide and hydrogen, but primarily at the production of carbon monoxide. Hydrogen can also be produced in the described method, but in smaller quantities compared to co-electrolysis.

In the described method, the carbon monoxide is obtained from carbon dioxide by means of electrolysis, preferably in the manner of high-temperature electrolysis. This takes place in an electrolytic cell. The electrolytic cell preferably has an anode and a cathode, which are separated from one another at least by an electrolyte. In addition to the electrolyte, further layers can be arranged between the anode and the cathode. Preferably, the electrolytic cell is substrate-supported or electrolyte-supported. As the substrate-supported configuration, it is preferable for the cathode to be formed as a Ni-YSZ electrode, the electrolyte to be formed from YSZ, a barrier layer of CGO to be interposed between the electrolyte and the anode, and the anode to be formed from LSC. Alternatively, as an electrolyte-supported configuration, it is preferable for the cathode to be formed as a Ni-CGO electrode, the electrolyte to be formed from YSZ, a barrier layer of CGO to be interposed between the electrolyte and the anode, and the anode to be formed from LSCF.

Furthermore, the electrolytic cell preferably has an anode space that adjoins the anode. A gas can flow along the anode in the anode space. Furthermore, the electrolytic cell preferably has a cathode space that adjoins the cathode. A gas can flow along the cathode in the cathode space. The anode space and/or cathode space preferably each have an inlet and an outlet.

The carbon dioxide used for the described method can come from any source. The carbon dioxide can arise in particular as a product of combustion. The carbon dioxide-containing gas produced during combustion is preferably purified before it is supplied to the electrolytic cell. In particular, sulfur compounds, silicon compounds, halogen compounds and certain hydrocarbons, such as aromatics and polyaromatics, are preferably removed from the gas. The gas purified in this way can be supplied directly to the electrolysis. Alternatively, the gas produced during combustion can also be temporarily stored and/or transported in a container (before or after purification) in order to then be fed to purification or the electrolytic cell.

The described method starts from an educt gas comprising carbon dioxide. The educt gas can be pure carbon dioxide or can have other components, in particular carbon monoxide and/or water vapor. The educt gas preferably contains 5 to 15% carbon monoxide. As a result, for example, reoxidation of nickel in the electrolyte can be prevented or at least reduced. The fact that the described method is used to produce carbon monoxide does not rule out the use of carbon monoxide as an educt. Thus, further carbon monoxide can be produced with the described method when using carbon monoxide as an educt. The amount and carbon monoxide can therefore be increased by means of the described method. The carbon monoxide used as an educt can be, at least after the method has started, carbon monoxide from the product gas. In this case, part of the carbon monoxide obtained is fed back into the method.

The educt gas comprising carbon dioxide is preferably introduced into the cathode space in a gaseous state via the inlet of the cathode space such that the educt gas can flow along the cathode. If an electric current is applied between the anode and the cathode, the carbon dioxide from the educt gas is reduced at the cathode according to the following chemical equations:

$$CO_2(g) + 2e^- \rightarrow CO(g) + O^{2+} \qquad (1)$$

Based on this reaction equation, a molecule of gaseous carbon dioxide ($CO_2$) is converted to a molecule of gaseous carbon monoxide (CO) and an oxygen ion ($O^{2-}$) by taking up two electrons ($e^-$).

The electrolyte is preferably permeable to oxygen ions ($O^{2-}$, but not to gas molecules such as $CO_2$, CO, $H_2O$ or $H_2$. The oxygen ions ($O^{2-}$) can therefore get from the cathode space into the anode space. The following oxidation reaction can take place there:

$$2\, O^{2-} \rightarrow O_2(g) + 4e^- \qquad (2)$$

Based on this reaction equation, two oxygen ions ($O^{2-}$) are converted to a molecule of gaseous oxygen ($O_2$), four electrons ($e^-$) being released.

Electrons can be moved from the anode to the cathode via a voltage source. The reaction equations (1) and (2) result in the following balancing equation for the electrolytic cell:

$$x\, CO_2 \rightarrow x\, CO + \tfrac{1}{2}x\, O_2 \qquad (3)$$

Carbon monoxide can therefore be obtained from carbon dioxide by supplying of energy by means of the electrolytic cell. The carbon monoxide is produced at the cathode and can be discharged via an outlet in the cathode space. Furthermore, oxygen is formed in the anode space, which oxygen can be discharged via the outlet of the anode space. Oxygen can also be produced using the described method. The carbon monoxide and the oxygen can thus be obtained separately from one another.

It is preferred that the anode space is flushed with a flushing gas. Air, oxygen ($O_2$) and/or nitrogen ($N_2$), for example, can be considered as the flushing gas. The oxygen formed at the anode can be conducted away from the anode by the flushing gas. The partial pressure of the oxygen at the anode can therefore be lowered. As a result, the voltage to be applied between the anode and cathode for the electrolysis is lower, which means that energy can be saved. The efficiency can thus be increased by the flushing gas. The flushing gas is preferably heated to a temperature within the range of 800 to 900° C. before being introduced into the anode space. As a result, thermal stresses within the electrolytic cell can be avoided.

The electrolysis is carried out with the educt carbon dioxide, which is supplied to the electrolytic cell in a gaseous state. This takes place in the described method according to step b) such that the electrolysis can be carried out according to step c). The electrolysis preferably takes place at a temperature of 800 to 900° C. To this end, the educt gas is preferably heated to this temperature in step b).

During the electrolysis according to step c), the temperature is preferably kept within the range from 800 to 900° C.

It has been found that the efficiency of the electrolysis can be increased by humidifying the educt gas before the electrolysis and in particular before the heating. In addition, it was found that the educt gas can be cleaned by means of humidification. Depending on the source of the carbon dioxide, the educt gas can contain impurities that can be at least in part removed by means of humidification.

In the described method, the educt gas is therefore humidified in step a). Educt gas is understood to mean the gas present before the humidification, which in any case comprises carbon dioxide. Humidification turns the educt gas into "humidified educt gas," which contains a higher proportion of water than the "educt gas." The humidification preferably takes place before the heating for the electrolysis such that the humidified educt gas is heated.

The humidified educt gas is supplied to the electrolytic cell, in particular by being introduced into the cathode space. Increased efficiency can be achieved in the electrolysis then carried out according to step c). This can be explained by the water content in the humidified educt gas. The water in the educt gas can be reduced at the cathode based on the following chemical equation:

$$H_2O(g) + 2e^- \rightarrow H_2(g) + O^{2-} \qquad (4)$$

Based on this reaction equation, a water vapor molecule ($H_2O$) is converted to a molecule of gaseous hydrogen ($H_2$) and an oxygen ion ($O^{2-}$) by taking up two electrons ($e^-$).

Furthermore, the water content in the educt gas can react with carbon monoxide to form carbon dioxide and hydrogen according to the following reaction equation:

$$H_2O(g) + CO(g) \rightleftharpoons H_2(g) + CO_2(g) \qquad (5)$$

This reaction, also known as the "reversible water gas shift," is an equilibrium reaction such that carbon dioxide and hydrogen can also react to form carbon monoxide and water. The electrolysis reduces carbon dioxide ($CO_2$) to carbon monoxide based on reaction equation (1) and water vapor ($H_2O$) to hydrogen ($H_2$) based on reaction equation (4). This changes the proportions in reaction equation (5) such that the chemical equilibrium is disturbed. This can cause the formation of water vapor ($H_2O$) and carbon monoxide (CO) from hydrogen ($H_2$) and carbon dioxide ($CO_2$). Electrolysis with humidified educt gas is therefore particularly efficient because the conversion of carbon dioxide to carbon monoxide can be additionally supported with hydrogen formed during electrolysis.

Because of reaction equation (5), the product gas can contain a proportion of gaseous carbon dioxide and/or a proportion of water vapor. It is preferred that, after emerging from the outlet of the cathode space, the product gas is separated into carbon monoxide on the one hand and into all the other substances on the other hand. The other substances can be primarily carbon dioxide and/or water. The separated carbon dioxide and/or water can be returned to the electrolysis.

The humidification according to step a) takes place with water. It is not just water vapor that is added to the educt gas. This would be disadvantageous in terms of energy because a considerable energy input would be required to evaporate water. The described method differs from co-electrolysis in this respect in particular. The humidified educt gas contains a water content. Various methods can be used to humidify the educt gas. For example, the educt gas can be passed to the cathode space through a humidifier in a supply line.

According to a preferred embodiment of the method, the educt gas is passed through the water in step a).

It has been found that in the described method it is particularly efficient to pass the educt gas through water. In this context, "passing through" means that the educt gas is introduced into the water, comes into direct contact with the water and is then collected. It is therefore not sufficient for the educt gas to be passed through a line surrounded by the water such that there is no direct contact between the educt gas and the water. The educt gas is preferably passed through the water in the form of bubbles. For example, the educt gas can be introduced into the water from a large number of nozzle openings below a water surface. The educt gas then rises as bubbles in the water. The educt gas can then be collected after emerging from the liquid water and passed on via a hose or a pipe or passed on directly via a hose or a pipe. The humidified educt gas can be compressed with a pump, but this is not necessary.

According to a further preferred embodiment of the method, the water in step a) is at a temperature within the range from 18 to 25° C.

The specified temperature range corresponds to normal room temperature. An increase in efficiency can already be achieved if the carbon dioxide is passed through the water in step a), which is at such a temperature. Accordingly, no heating is required for the water. Also, no energy has to be used to heat the water.

When using water at a temperature within the range from 18 to 25° C., a carbon dioxide humidity level of 3 to 5% can be achieved.

If, for example, a mixture of 90% gaseous carbon dioxide and 10% gaseous carbon monoxide is used as the educt gas and is humidified in step a) with water at 18 to 25° C., a humidified educt gas containing 87.3% gaseous carbon dioxide, 9.7% gaseous carbon monoxide and 3.0% water vapor can be obtained. Said humidified educt gas can then be added to the electrolysis. In this case, the product gas obtained at the cathode can have less than 1% hydrogen. This can be explained by the shift in equilibrium from reaction equation (5).

According to a further preferred embodiment of the method, the water in step a) is at a temperature within the range from 25 to 40° C.

In this embodiment, the water is warmed to room temperature. An increased humidity level of the carbon dioxide can be achieved by using heated water. For example, at a water temperature of 33° C., a carbon dioxide humidity level of 5% can be achieved.

If, for example, a mixture of 90% gaseous carbon dioxide and 10% gaseous carbon monoxide is used as the educt gas and is humidified in step a) with water at 33° C., a humidified educt gas with 85.5% gaseous carbon dioxide, 9.5% gaseous carbon monoxide and 5.0% water vapor can be obtained, which can be added to the electrolysis. The product gas obtained at the cathode can also have less than 1% hydrogen in this case. This can again be explained by a shift in the equilibrium from reaction equation (5).

Various methods can be used to heat the water. For example, a heater, an immersion heater and/or a heat exchanger can be used.

According to a further preferred embodiment of the method, the water used for step a) is heated by heat from a product of the electrolysis from step c).

In this embodiment, the heat of the products of the electrolysis can be recovered and utilized. Both the products formed at the cathode and the products formed at the anode come into consideration as products. At the cathode, on the one hand, this is the carbon monoxide produced by means of the method described. Furthermore, hydrogen can be formed at the anode. Oxygen is formed at the cathode. The products of the electrolysis can have usable thermal energy, in particular due to heating the educt gas before electrolysis. This also applies to components in the educt gas that leave the cathode space again without being involved in a chemical reaction. If these parts were also heated before electrolysis, their thermal energy can be recovered after electrolysis for heating the water used for step a). The products can also be heated due to the chemical reactions taking place.

The heat from the electrolysis products can be used in various ways to heat the water for step a). For example, a product gas stream can be passed through a line within the water. To be able to dissipate heat over as long a line length as possible, the line is preferably designed in a spiral shape.

Preferably, only the products from the cathode or only the products from the anode are passed through the line such that these products are not mixed. It is also possible to provide a respective line for the products of the anode on the one hand and for the products of the cathode on the other hand. Mixing can also be prevented in this way.

Alternatively, the heat of the products or part of the products can be given off to a heat transfer medium via a heat exchanger. The heat transfer medium can be conveyed to a further heat exchanger in which the heat transfer medium gives off its heat to the water used for step a). Preferably, only the products from the cathode or only the products from the anode are passed through the heat exchanger such that these products are not mixed. It is also possible to provide a respective heat exchanger and/or a respective branch of a common heat exchanger for the anode products on the one hand and for the cathode products on the other hand.

According to a further preferred embodiment of the method, step a) is carried out in such a way that, after step a), the water content of the humidified educt gas is 2 to 6%.

The water content of the humidified educt gas after step a) can be adjusted by various measures. For example, if carbon dioxide is passed through the water as bubbles, more water can be taken up at a higher water temperature, a higher carbon dioxide temperature, a lower carbon dioxide flux, a smaller bubble size, and/or a greater distance from the water surface. The water content of the humidified educt gas can be adjusted by changing these and/or other parameters. The parameters for a particular desired water content can be determined experimentally.

The yield of carbon monoxide is higher, the lower the water content is in the humidified educt gas. The efficiency increases with the water content of the humidified educt gas up to a water content of the humidified educt gas of about 20%. It has been found that a water content of 2 to 6% in the humidified educt gas is a good compromise between these two aspects.

As a further aspect of the invention, a device for producing carbon monoxide is presented. The device comprises:
- an electrolytic cell having an anode and a cathode, which are separated by an electrolyte, and a cathode space adjoining the cathode, and
- a supply line to the cathode space, which comprises a humidifier.

The described special advantages and design features of the method can be used and transferred to the device, and vice versa. The described method is preferably carried out using the described device. The described device is preferably intended and configured to carry out the described method. An educt gas comprising carbon dioxide can be humidified (step a) of the described method) and supplied to the electrolytic cell (step b)) via the supply line having the humidifier. The electrolysis can be carried out in the electrolytic cell (step c)). To this end, the electrolytic cell preferably has a current and voltage source, by means of which a current can be applied between the cathode and the anode. The electrolytic cell is preferably designed as a high-temperature electrolytic cell.

A gas can flow along the cathode in the cathode space. Furthermore, the electrolytic cell preferably has an anode space that adjoins the anode. A gas can flow along the anode in the anode space. The anode space and/or cathode space preferably each have an inlet and an outlet. The electrolytic cell preferably also has a supply line to the cathode space, via which supply line a flushing gas can be introduced into the anode space.

According to a preferred embodiment, the device further comprises a heating means for heating water within the humidifier by means of a product of electrolysis occurring in the electrolytic cell.

The heating means preferably comprises a line through which products of the electrolysis can be passed through the water used for step a). Alternatively, the heating means can also comprise the heat exchangers described above.

In the following, the invention and the technical environment will be explained in more detail with reference to the drawings. It should be noted that the invention is not supposed to be limited by the depicted embodiments. In particular, unless explicitly stated otherwise, it is also possible to extract partial aspects from the facts described in the figures and to combine them with other components and insights from the present description and/or the figures. In particular, it must be noted that the figures and in particular the depicted size ratios are only schematic. Identical reference signs denote identical objects, so that explanations from other figures can be used in a supplementary manner, if necessary. In the drawings:

FIG. 1: is a flowchart of a method according to the invention, and

Figure 2:
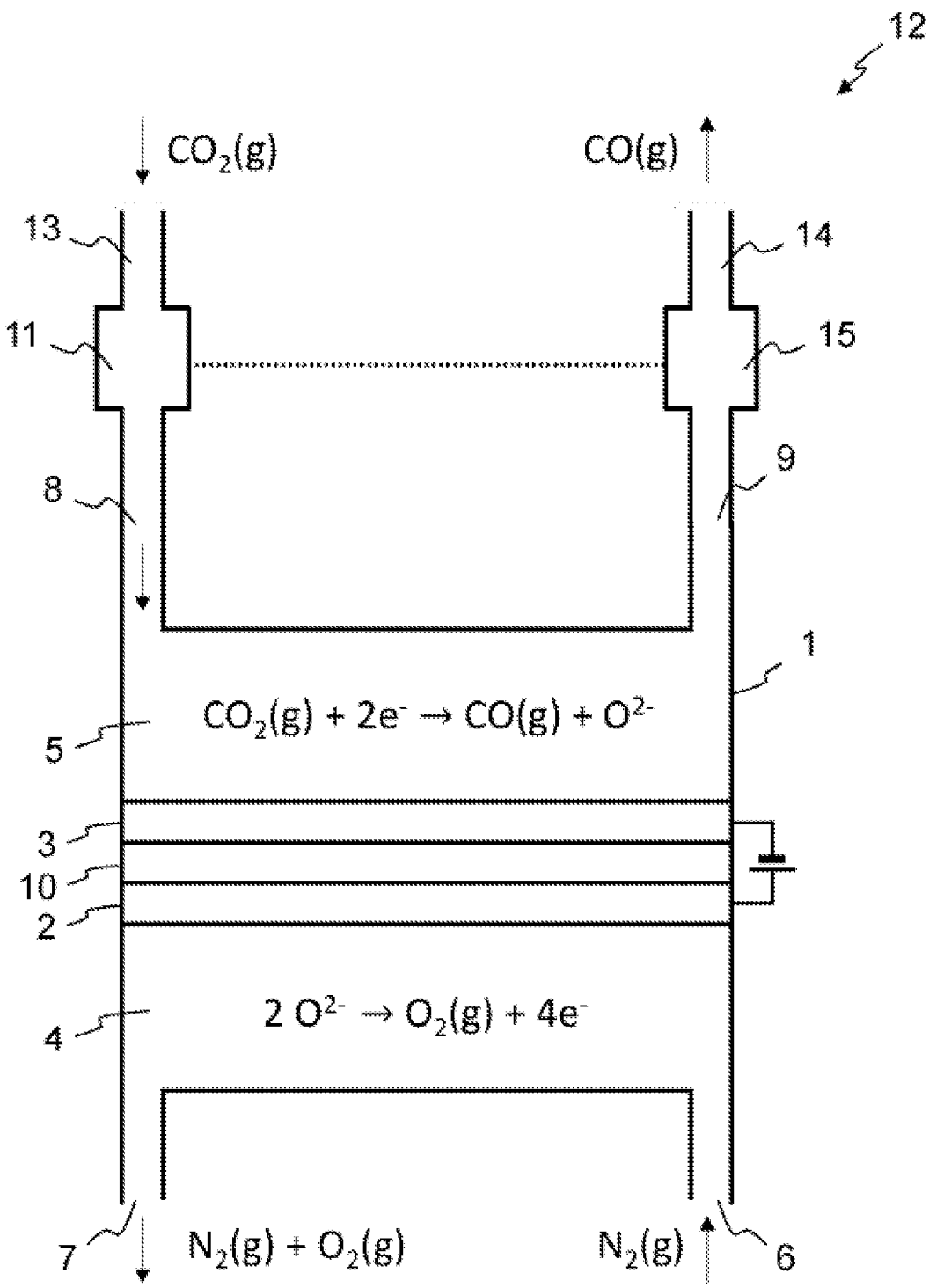

FIG. 2: shows a device according to the invention.

FIG. 1 shows a flowchart of a method for producing carbon monoxide. The method is described using the reference signs from FIG. 2. The method comprises:
a) humidifying an educt gas containing carbon dioxide with water,
b) supplying the humidified educt gas from step a) into an electrolytic cell 1, and
c) electrolyzing the humidified educt gas supplied according to step b) in the electrolytic cell 1 such that the carbon monoxide is obtained.

FIG. 2 shows a device 12 for producing carbon monoxide, in particular according to the method from FIG. 1. The device 12 comprises an electrolytic cell 1 having an anode 2 and a cathode 3, which are separated from one another by an electrolyte 10. Furthermore, the electrolytic cell 1 comprises an anode space 4 adjoining the anode 2, in which anode space a gas can flow along the anode 2. Furthermore, the electrolytic cell 1 comprises a cathode space 5 adjoining the cathode 3, in which cathode space a gas can flow along the cathode 3. The anode space 4 has an inlet 6 and an outlet 7. The cathode space 5 has an inlet 8 and an outlet 9. A supply line 13 having a humidifier 11 is connected to the inlet 8 of the cathode space 5. A discharge line 14 is connected to the outlet 9 of the cathode space 5. The discharge line 14 comprises a heating means 15 for heating the humidifier 11 by means of a product of electrolysis occurring in the electrolytic cell 1. A dotted line indicates that heat can be conducted from the heating means 15 to the humidifier 11.

An educt gas containing carbon dioxide can be supplied to the cathode space 5 via the supply line 13 to the cathode space 5 (step b) of the method from FIG. 1). The educt gas can be humidified with the humidifier 11 (step a)). The electrolysis can be carried out in the electrolytic cell 1 (step c)). The carbon dioxide from the humidified educt gas is reduced to carbon monoxide at the cathode 3. At the anode 2, the oxygen ions formed during electrolysis can react to form oxygen. A flushing gas can be introduced into the inlet 6 of the anode space 4 and conducted out of the outlet 7 of the anode space 4 together with the oxygen produced in this way. In the embodiment shown, the flushing gas is nitrogen. Alternatively, however, oxygen in particular can also be used as the flushing gas.

The educt gas can be humidified in step a) by passing the educt gas through water, in particular inside the humidifier 11. A water content of the humidified educt gas is preferably 2 to 6%. The water inside the humidifier 11 can be heated via the heating means 15 by a product gas taken from the cathode space 5, preferably to 25 to 40° C.

Alternatively, the water can also be used at room temperature, in particular at 18 to 25° C.

With the described method and with the described device 12, carbon monoxide can be produced via $CO_2$ electrolysis with particularly high efficiency. This is achieved with the educt gas containing carbon dioxide being humidified before the electrolysis.

LIST OF REFERENCE SIGNS 1 electrolytic cell
2 anode
3 cathode
4 anode space
5 cathode space
6 inlet of the anode space
7 outlet of the anode space
8 inlet of the cathode space
9 outlet of the cathode space
10 electrolyte
11 humidifier
12 device
13 supply line to the cathode space
14 discharge line from the cathode space
15 heating means

The invention claimed is:

1. A method for producing carbon monoxide, comprising:
a) humidifying an educt gas containing carbon dioxide with water,
b) supplying the humidified educt gas from step a) into an electrolytic cell, and
c) electrolyzing the humidified educt gas supplied according to step b) in the electrolytic cell such that the carbon monoxide is obtained
wherein the water used for step a) is heated by the heat of a product of the electrolysis from step c).

2. The method according to claim 1, wherein the educt gas is passed through the water in step a).

3. The method according to claim 1, wherein the water in step a) is at a temperature within the range from 18 to 25° C.

4. The method according claim 1, wherein the water in step a) is at a temperature within the range from 25 to 40° C.

5. The method according to claim 1, wherein step a) is carried out in such a way that, after step a), a water content of the humidified educt gas is 2 to 6%.

6. A device for producing carbon monoxide, comprising:
- an electrolytic cell having an anode and a cathode, which are separated from one another by at least one electrolyte, and a cathode space adjoining the cathode,
- a supply line to the cathode space, which comprises a humidifier, and
- a heating means for heating water within the humidifier by means of a product of electrolysis occurring in the electrolytic cell.

7. The method according to claim 2, wherein the water in step a) is at a temperature within the range from 18 to 25° C.

8. The method according claim 2, wherein the water in step a) is at a temperature within the range from 25 to 40° C.

9. The method according to claim 2, wherein the water used for step a) is heated by the heat of a product of the electrolysis from step c).

10. The method according to claim 2, wherein step a) is carried out in such a way that, after step a), a water content of the humidified educt gas is 2 to 6%.

11. The method according claim 3, wherein the water in step a) is at a temperature within the range from 25 to 40° C.

12. The method according to claim 3, wherein the water used for step a) is heated by the heat of a product of the electrolysis from step c).

13. The method according to claim 3, wherein step a) is carried out in such a way that, after step a), a water content of the humidified educt gas is 2 to 6%.

14. The method according to claim 4, wherein the water used for step a) is heated by the heat of a product of the electrolysis from step c).

15. The method according to claim 4, wherein step a) is carried out in such a way that, after step a), a water content of the humidified educt gas is 2 to 6%.

16. The method according to claim 1, wherein step a) is carried out in such a way that, after step a), a water content of the humidified educt gas is 2 to 6%.

* * * * *